United States Patent [19]

Cole et al.

[11] Patent Number: 4,787,949

[45] Date of Patent: Nov. 29, 1988

[54] METHOD OF MANUFACTURING HIGHLY WATER ABSORBENT PLEATED FILTER LAMINATE

[75] Inventors: Frederic W. Cole, Greensboro, N.C.; John E. Thurber, Tulsa, Okla.

[73] Assignee: Facet Automotive Filter Co., Tulsa, Okla.

[21] Appl. No.: 880,206

[22] Filed: Jun. 30, 1986

[51] Int. Cl.⁴ .............................................. B01D 39/16
[52] U.S. Cl. .................................... 156/222; 156/284; 210/689; 210/493.5; 210/502.1; 210/504
[58] Field of Search .................................. 156/283–285, 156/222; 210/282, 493.1–493.5, 502.1, 504, 505, 507, 508, 689; 264/131

[56] References Cited

U.S. PATENT DOCUMENTS

| 4,033,881 | 7/1977 | Pall | 210/505 |
| 4,539,107 | 9/1985 | Ayers | 210/502.1 |
| 4,618,388 | 10/1986 | Ayers | 156/284 |

*Primary Examiner*—Ivars Cintins
*Attorney, Agent, or Firm*—Head & Johnson

[57] ABSTRACT

A superabsorbent filter medium which is suitable for manufacturing accordian pleated filter cartridges at high production rates and low cost by using a rotary pleater or scoring machine rather than slower blade-type pleaters. The filter medium is a thin laminate of filter paper, superabsorbent resin powder, and tissue papper, rolled together under pressure and bonded with water vapor. Unlike other commercially available superabsorbent filter media laminates, this construction is thin and flexible enough to be rotary pleated at low cost.

4 Claims, 2 Drawing Sheets

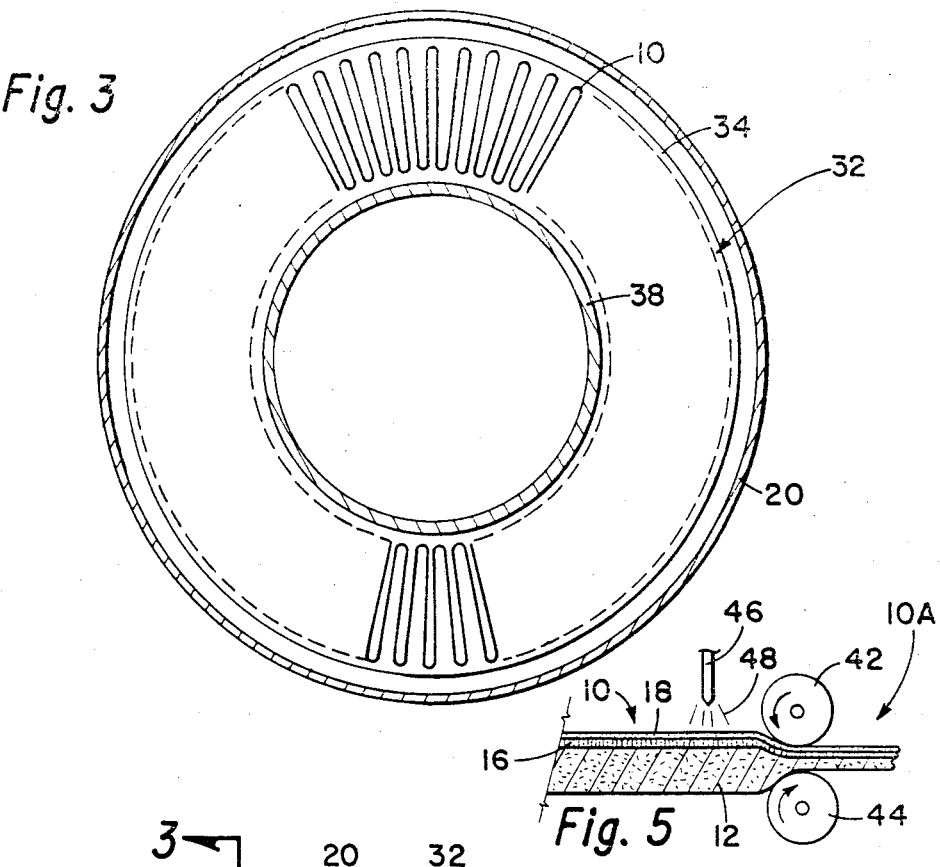
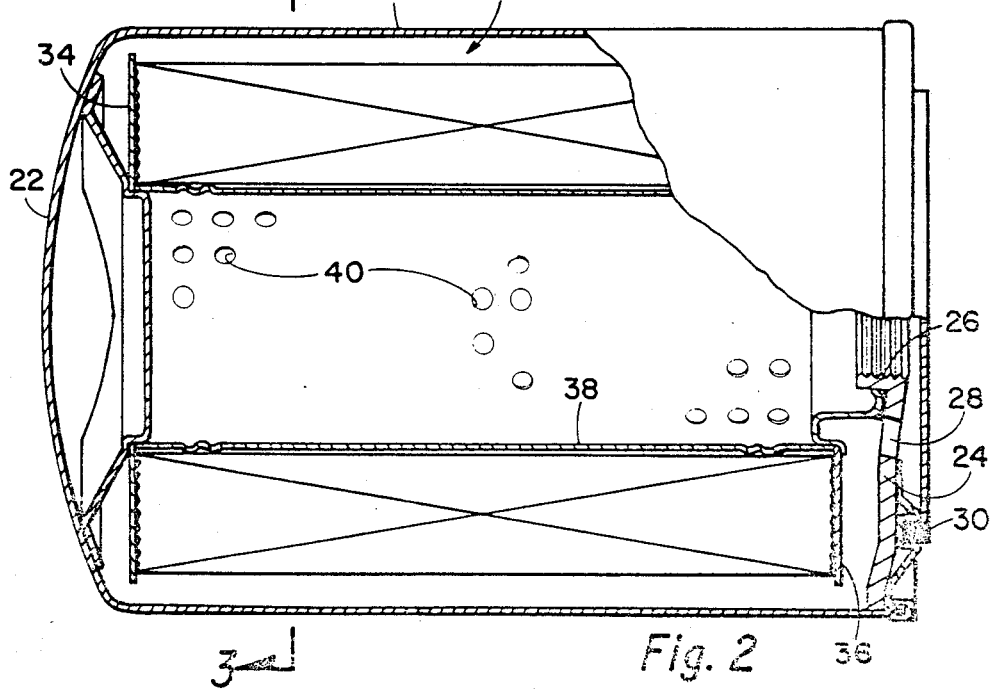

METHOD OF MANUFACTURING HIGHLY WATER ABSORBENT PLEATED FILTER LAMINATE

BACKGROUND OF THE INVENTION

This invention teaches novel superabsorbent filter media, a fuel filter using such filter media and a method of manufacturing such filter media. The fuel filter media is suitable for use in manufacturing accordian pleated filter cartridges at high production rates and low cost by using a rotary pleater or scoring machine rather than slower blade-type pleaters. The filter medium is a thin laminate of filter paper, superabsorbent resin powder, and tissue paper, rolled together under pressure and bonded with water vapor. Unlike other commercially available superabsorbent filter media laminates, this construction is thin and flexible enough to be rotary pleated at low cost.

Diesel fuel, jet fuel, and, to a lesser extent, gasoline dissolve and entrain small amounts of water. The water may be introduced by leakage, accidental contamination, or, most commonly, by atmospheric condensation. Hydrocarbon fuels can dissolve about 75 to 150 parts per million (ppm) of water at room temperature. Water solubility increases about 1 ppm for each 1° F. rise in temperature, and decreases about 1 ppm for each 1° F. fall in temperature. Excess water or undissolved water may accumulate in lower parts of a fuel handling system as a result of temperature changes over a period of time.

Undissolved water can be harmful to engines in which the fuel is used. Diesel engine injectors may be damaged by steam formation, jet turbine engines may flame-out, and gasoline engines may suffer ignition problems. Many water separating devices and filters have been developed to remove undissolved or free water from these fuels and prevent these engine problems.

Simple mechanical devices based on separation by gravity or centrifugal force are satisfactory if the free water is present as a discrete second phase. However, free water is often emulsified by pumps and valves, and may remain as a stable emulsion, especially in diesel or jet fuel. Two-stage coalescer/separators are designed to remove water emulsions. The coalescer breaks the emulsion by preferential wetting of fibrous materials such as fiber glass. The water is accumulated into large droplets and is removed by gravity separation against a hydrophobic separator material such as Teflon coated wire cloth or silicone impregnated paper. The presence of wetting agents or surfactants may interfere with the coalescence of water emulsions, especially in jet and diesel fuels.

More recently, superabsorbent materials have been used to remove water from fuels directly during filtration to remove dirt and similar contamination. The water absorbent material is pleated with the filter paper or is added as a lamination to the filter paper. Water is absorbed from the fuel in both droplet and emulsion form. Unlike coalescers, absorbent filters are not disarmed by surfactants. They are called "superabsorbent" filters because the absorbent materials can hold from 30 to more than 300 times their weight in water.

Many superabsorbent materials were first developed for use in personal care products such as tampons, disposable diapers and panty liners, and were later adapted to filters. Carboxymethyl cellulose (CMC) holds about 30 times its weight in water and was manufactured for use as a tampon material. It was available in several grades of paper-like material, and was incorporated in several commercial superabsorbent filters for fuel applications. Since toxic shock syndrome problems were traced to the CMC tampon, the product has not been made in the United States.

Other superabsorbent materials such as starcha-crylonitrile copolymer (or graft), polyacrylamide, and polyacrylic acid resins have been produced in powder form for personal care applications, and have been adapted for use in superabsorbent filters. These polymers hold several hundred times their weight in water, and are used by distributing a small amount of powder into a fibrous matrix such as fiber glass or non-woven polyester fiber mat. The fibrous material is bonded to a filter paper using water vapor to wet the resin which acts like a glue, without consuming much water absorbent capacity. These superabsorbent filter media are now commercially available.

A major application for superabsorbent filters is on fuel dispensing pumps. Spin-on filters, similar in construction to spin-on lube oil filters, are installed by the manufacturer within the dispensing pump housing, or can be retrofitted using an adaptor head at the pump-/hose coupling. Such superabsorbent filters remove both water and dirt from gasoline and diesel fuels with good filtration and long service life. Intermittent, small amounts of water are absorbed, and later released by dissolving harmlessly in dry fuel. Accidental large slugs of water are intercepted, preventing damage to vehicle fuel systems and engines, and dispensing flow is automatically shut down to insure detection and correction of the problem.

Presently available superabsorbent media and superabsorbent filter media laminates are fairly thick to ensure sufficient contact time for water absorption during flow. As a result, the number of pleats and the total filter area in a pleated cartridge assembly are limited. This, in turn results in a higher fluid velocity or flow rate per unit filter area, and partially defeats the original intent to provide sufficient contact time for absorption. Moreover, the thicker materials must be pleated using a blade-type pleating machine such as a Chandler or Rabofsky pleater, rather than a high-speed rotary or scoring machine pleater. An additional wrapping of superabsorbent media around the internal support core is often used to intercept water leaks through the pleated media, and to aid in shut-down.

The thicker pleats are widely spaced at the outside diameter to allow flow without pinching off at the inside diameter of the pleat block assembly. Automatic shut down of fuel flow in response to accidental ater slugs depends on absorption of water by the superabsorbent material and swelling of the composite or laminate. With sufficient swelling, the pleats are squeezed together, first at the inside diameter, but only later at the more widely spaced outside diameter. A "belly band" or open mesh wrapping is often added to the pleated filter element assembly to constrain bulging and more effectively shut down fuel flow. This adds cost for materials and labor.

SUMMARY OF THE INVENTION

The invention relates to highly water absorbent, thin, flexible filter media which are capable of rotary pleating, to the method of manufacturing such media, and to a fuel filter employing such media.

The filter media is formed of a flat base sheet of phenolic impregnated filter paper which typically is about 0.015 inch thick. A water absorbent powder is applied uniformly over the base sheet at a rate of about 5 grams per square foot. The powder may be selected from polyacrylic acid resin powder, polyacrylamide powder, starch-acrylonitride copolymer powder, starch-acrylonitride graft powder of mixtures thereof. A powder which has proven highly successful in tests is polyacrylic acid resin powder.

After the powder is distributed onto the base sheet a thin, porous layer of airlaid tissue paper about 0.005 inch thick is laid over the resin powder. This substrate consisting of the three layers described is then formed into the required filter media by applying water vapor to the substrate and in the presence of such water vapor applying pressure to the substrate such as by passing the substrate between rollers.

The filter media thus formed is very highly water absorbent and yet is thin and flexible enough to adapt itself to inexpensive and rapid pleating utilizing rotary pleating machinery. In the practical application of the invention the filter media is formed in large rolls and slit to width and pleated to form a filter element which is inserted into a filter cannister. The interior of the filter element communicates with one port in the cannister while the exterior communicates with another port so that fluid flowing through the filter passes through the media where solids are filtered and undissolved water is absorbed.

For additional background information relating to water absorbent filters, the media therefor and methods of manufacturing the media, reference may be had to the following U.S. Pat. Nos: 3,528,546; 3,528,547; 4,242,206; and 4,539,107.

A better understanding of the invention will be had by reference to the following description and claims taken in conjunction with the attached drawings:

DESCRIPTION OF THE DRAWINGS

FIG. 2 is an elevational view, shown partly in cross-section, of a fuel filter employing the principles of this invention.

FIG. 3 is a cross-sectional view taken along the line 3—3 of FIG. 2.

FIG. 5 is a rudimentary elevational cross-sectional view disclosing the method of manufacturing the highly water absorbent filter media.

DESCRIPTION OF THE PREFERRED EMBODIMENT

Figure 1:
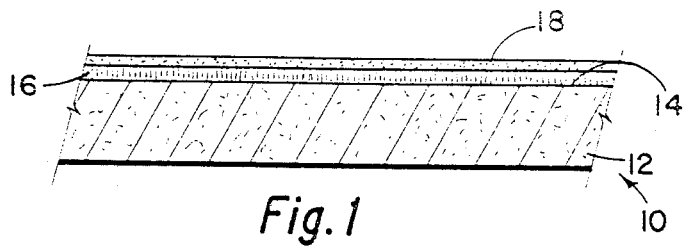
FIG. 1 is a fragmentary, highly enlarged, cross-sectional view of a sheet of flexible highly water-absorbent filter media which is adaptable for rotary pleating for use in making fuel filters.

Referring to the drawing and first to FIG. 1, a highly enlarged, fragmentary, cross-sectional view of a sheet of highly water-absorbent filter medium which is adaptable for rotary pleating is shown. The sheet of filter media is generally indicated by the numeral 10 and is formed of three layers. The first is a flat base sheet 12 having an upper surface 14. The base sheet 12 is of phenolic impregnated filter paper commonly commercially available and is of about 0.015 inch thickness. Further, the preferred paper is a sheet of about 23 p. weight and of about 5 micron porosity although sheets having higher or lower weights and greater or less porosity will function in the invention. Applied to the top surface 14 of base sheet 12 is a substantially uniform layer of highly water absorbent powder 16. The water absorbent powder 16 is preferably applied at a rate of about 5 grams per square foot of base sheet 12. The water absorbent powder 16 is preferably formed from one of the following materials: polyacrylic acid resin powder; polyacrylamide powder; starch-acrylonitride copolymer powder; starchacrylonitrile graft powder. While each of the powders mentioned functions satisfactorily, and there may be others which have not at this time been identified, the preferred embodiment of the invention employs polyacrylic acid resin powder.

Layed over the water absorbent powder 16 is thin, porous tissue paper 18. The tissue paper 18 is preferably of about 0.005 inches thick.

The assembly of the three layers of FIG. 1 is then subjected to water vapor and pressed, as between rollers to compact the three layers into a uniform composite sheet of about 0.020 inch thickness.

The sheet thus formed is very thin compared to the standard sheets of filter media commercially used at the present time for forming pleated filter cartridges. Further, the material manufactured in this manner is uniquely characterized by its great adaptability for pleating which can be accomplished by high-speed rotary or scoring machine pleaters. This contrasts with the state of the art at the present time wherein the typical filter media designed to absorb water is substantially thicker, such as, typically 0.040 inches of thickness or greater and therefore which must be pleated on a blade-type pleating machine such as manufactured by Chandler or Rabofsky.

FIG. 2 shows a fuel filter employing the principles of this invention. The fuel filter is formed of a cannister housing 20 which is closed at one end 22 and which receives a base plate 24 at the other end. The base plate 24 includes a central threaded opening 26 by which the filter is attached to supporting equipment, such as a fuel dispensing pump. The threaded opening 16 forms one port for fluid flow, usually an outlet port. Formed in the base plate 24 are openings 28 (only one of which is seen) which form a second port for the filter and usually an inlet port. Secured to the baseplate 24 is a circumferential gasket 30 which seals the filter to the mechanism to which it is attached. The filter described up to this point is of standard design and construction.

Positioned within cannister 16 and separating the port 28 from port 26 is a tube of pleated filter paper generally indicated by the numeral 32. The tube 32 is sealed at one end by an end plate 34 and the other end by an end plate 36 which in turn is sealed against the base plate 24. A structural metal tube 38 having a plurality of openings 40 therein extends between the end plates 34 and 36. As shown in FIG. 3 the tube of pleated filter paper 32 surrounds the structural tube 38. Fuel flowing into the interior of cannister 20 through port 28 flows through the pleated filter and through openings 40 and structural tube 38 and thence through port 26 out of the filter.

The new superabsorbent filter design and construction has been tested and performs at least as well as the presently available superabsorbent dispensing pump filters previously discussed. A major difference, however, is that it can be manufactured at a high production rate and at about two-thirds of the cost of a conventional superabsorbent filter. This important difference results from the use of a novel, thin superabsorbent filter media laminate.

The laminate or substrate, consists of standard, resin-impregnated 23 P grade "5-micron" filter paper, flat and uncorrugated; about 5 grams per square foot of polyacrylic acid resin powder, uniformly distributed; and a very light air-laid tissue paper. The laminate is made on a special converting machine, designed and used for making panty liners and similar products. The papers are continuously laminated in large, wide rolls with the powder between them, using water vapor to provide a bond and to lock the powder in place. The rolls are finally slit to width for pleating. Total cost is only about $0.10 per square foot more than the cost of the filter paper itself, or about $0.30 per finished filter assembly.

FIG. 5 illustrates in rudimentary manner a method of manufacturing a thin, flexible sheet of highly water absorbent filter media according to the invention. To a flat sheet of phenolic impregnated filter paper 12 a uniform layer of highly water absorbent powder 16 is applied at a rate of about 5 grams per square foot. Thin, porous tissue paper 18 is air layered onto the absorbent powder forming a three layer substrate. Water vapor 48 is applied from a spray 46 and the substrate is passed between rollers 42 and 44 to form the finished sheet 10A of filter media. The sheet 10A can then be cut into strips and pleated for forming a tube 32 of pleated filter media shown in FIG. 3.

The resultant superabsorbent filter media laminate is very thin in comparison to other known laminates. Many more pleats with much closer spacing and greater total filter area can be used. This results in lower fluid velocity or flow rate per unit area through the filter, and longer residence time for water absorption. The closer pleat spacing facilitates shut down on swelling, and eliminates the need for a belly band wrapper and its cost. Finally, the thin laminate can be rotary pleated or scored at high production rates on existing lube-oil paper filter lines with no increase in cost over present manufacturing methods.

The following commercially available superabsorbent dispensing pump filters were purchased and compared against a filter constructed according to the principles of this invention:

1. Velcon Filters, Inc., Aquacon ® model AC-4055P. U.S. Pat. No. 2,242,206. this is apparently mislabeled and should be U.S. Pat. No. 4,242,206, Dec. 30, 1980, entitled "Filter Dehydrator". This product uses carboxymethyl cellulose (CMC), fiber glass and filter paper to remove dirt and water from fuel. The filter core is wrapped with two layers of fine (0.005 in.) filter media and one layer (0.020 in.) of CMC media. The accordian pleated outer filter consists of two layers (0.023 in.) of CMC media sandwiched between two layers (0.015 in.) of circumferentially corrugated filter paper. The assembly is cemented into metal endcaps, and canned into a standard spin-on filter.

2. Central Illinois Mfg. Co. (CIMCO), Hydrasorb ™ model 300 HS, marked patents applied for. This filter uses an absorbent corn starch polymer, probably a starch-acrylonitrile graft, which has long been available as a superabsorbent polymer resin. The resin powder is bonded to a fiberglass matrix using a small amount of water vapor, which also serves to bond the fiberglasss to the filter paper. The core is wrapped with 16 mesh (0.009 in.) polyvinyl chloride (PVC) screen, and a filter media (0.015 in.) bonded to a resin impregnated fiberglass sheet (0.025 in.) on the outside surface. The assembly is cemented into metal endcaps, wrapped with a belly band of heat-sealed 16 mesh PVC screen about the middle half of the filter, and canned into a standard spin-on filter.

3. Wix Corp. NAPA diesel fuel pump filter model 4011, no patents indicated. This filter is almost identical in construction to the (2.) CIMCO filter. A heavier core-wrap filter medium (0.020 in.) has been used, possibly to reduce fiberglass media migration. Most other construction details are very much alike.

The three commercially available filters were compared with a filter made according to the present invention which uses a polyacrylic acid superabsorbent resin powder, water vapor bonded between 23 P, 5 micron uncorrugated filter paper (0.015 in.) and thin air-laid cellulose tissue (0.005 in.). The laminate was rolled under pressure to produce a thin, strong medium, containing no fiberglass, and capable of being rotary pleated at low cost. More than twice as many pleats and much greater filter area was used in the comparison. No filter core wrap was used or needed. No belly-band constrictor was used or needed. The assembly was cemented onto resin-impregnated paper-board endcaps and canned into a standard spin-on filter. Construction is much simpler and less costly in comparison to the other filters, and performance is at least as good.

Salient engineering parameters which illustrate the critical relationships between filter media area, flow velocity, media thickness, and residence time for absorption are shown for each of the above described filters at 12 GPM nominal maximum flow rate:

| PARAMETER | VEL-CON | CIM-CO | WIX | MODEL OF PRESENT INVENTION |
|---|---|---|---|---|
| Number of Pleats | 31 | 31 | 33 | 66 |
| Filter Media Area, in$^2$ | 112 | 171 | 176 | 433 |
| Flow Velocity, in/sec | 0.41 | 0.27 | 0.26 | 0.11 |
| Media Thickness, in | 0.075 | 0.040 | 0.040 | 0.020 |
| Residence Time, sec | 0.182 | 0.148 | 0.154 | 0.187 |
| Relative Time, % | 97 | 79 | 82 | 100 |

The relative effects of these parameters are confirmed by comparative absorption kinetics shown in actual tests using water dispersed in diesel fuel. A simulative test loop was designed and constructed to determine reaction time to shut-down as a function of dispersed water content in diesel fuel with flow rate as a parameter. Results were comparable for most filters, all of which were tested at 3, 6 and 12 GPM flow rate with water concentrations of 0.01, 0.1, 1.0 and 10 percent by volume. Dry, but water-saturated diesel fuel was pumped through the test system to establish the required flow rate for the test and to measure initial differential pressure for the test filter. The required flow of water was injected by a metering pump directly into the inlet of a centrifugal fuel dispensing pump to produce a fine water-in-fuel dispersion, or emulsion, simulating actual service. Pressure drop was monitored and flow rate was adjusted, using bypass valves, to maintain the required flow. A turbidity meter (0-200 ppm water) was used to detect leaks or test filter bypassing. Any residual water in the test filter effluent was removed by a large, efficient coalescer/separator to provide a source of known dry fuel without free water for recycling in the test loop.

Figure 4:
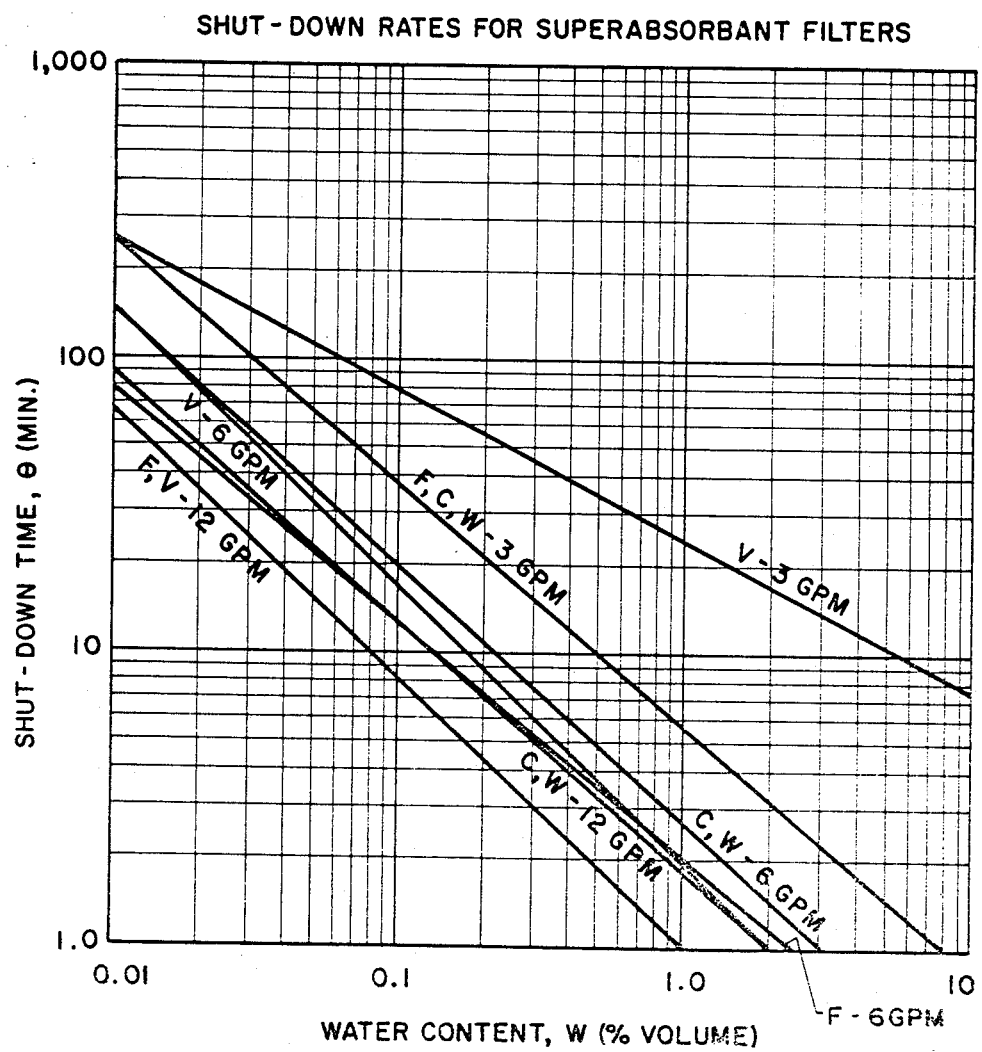
FIG. 4 is a graph showing shut-down time in minutes versus water content of fuel flowing through test filters comparing the filter of the present invention with three commercially available filters at three different flow rates.

Tests for each filter at each flow rate and each dispersed water concentration were conducted until fuel flow shut off reduced flow to a trickle under full pumping dead-head pressure of about 26 psi. Time required for shut down is approximated by an inverse power function of water content:

$$T = aW^b$$

where T is time, W is water content, and a and b are characteristic constants which are related to flow rate and filter construction. Least squares fit of experimental data showed coefficients of correlation, $r^2 = 0.96$ to $0.99+$ compared to 1.00 for perfect fits. These data are linearized by plotting on log-log graph paper with flow rate as a parameter, as shown in FIG. 4.

This plot shows that at a flow rate of 12 GPM, the filter of the present invention and Velcon have the fastest shut down rate. Cimco and Wix, with virtually identical construction, have the same, slightly slower shut down rate. The 6 GPM rates are bunched and slightly crossed for all filters. At 3 GPM, all filters are alike except for Velcon which has a much slower response. The average, general slope near 135 degrees for most test data suggests that response time is proportional to cumulative water exposure for these tests.

While the invention has been described with a certain degree of particularity it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A method of manufacturing highly water absorbent pleated filter laminate for use in a filter comprising the steps of:
    applying onto the surface of a flat base sheet of filter material a substantially uniform layer of highly water absorbent powder;
    applying a layer of thin, porous tissue over the layer of water absorbent powder to form a three layer substrate;
    applying water vapor to the substrate;
    applying pressure to the water vapor treated substrate to form a bonded laminate; and
    rotary pleating the bonded laminate on a scoring machine.

2. The method of manufacturing a highly water absorbent pleated filter laminate according to claim 1 wherein said highly water absorbent powder is selected from the group consisting of polyacrylic acid resin powder, polyacrylamide powder, starch acrylonitrile graft powder, carboxymethyl cellulose powder and mixtures thereof.

3. The method of manufacturing a highly water absorbent pleated filter laminate according to claim 1 wherein said base sheet is of about 23 P weight and about 5 micron filtration rating.

4. The method of manufacturing a highly water absorbent pleated filter laminate according to claim 1 wherein said thin, porous tissue is tissue paper of about 0.005 inch thickness.

* * * * *